(12) United States Patent
Gustin

(10) Patent No.: US 8,351,340 B2
(45) Date of Patent: Jan. 8, 2013

(54) METHOD FOR DETECTING A PROXY ARP AGENT IN SECURE NETWORKS HAVING EMBEDDED CONTROLLERS

(75) Inventor: Jay Gustin, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 311 days.

(21) Appl. No.: 12/760,268

(22) Filed: Apr. 14, 2010

(65) Prior Publication Data

US 2011/0255423 A1 Oct. 20, 2011

(51) Int. Cl.
*H04L 12/26* (2006.01)
(52) U.S. Cl. .................................................. 370/248
(58) Field of Classification Search .......... 370/241, 370/242, 248, 252; 709/220, 222, 227, 228
See application file for complete search history.

(56) References Cited

U.S. PATENT DOCUMENTS

| | | | |
|---|---|---|---|
| 5,708,654 A * | 1/1998 | Arndt et al. ............... | 370/242 |
| 5,751,971 A * | 5/1998 | Dobbins et al. ........... | 709/238 |
| 5,835,725 A * | 11/1998 | Chiang et al. ............. | 709/228 |
| 6,728,793 B1 | 4/2004 | McRobert et al. | |
| 6,822,955 B1 * | 11/2004 | Brothers et al. .......... | 370/389 |
| 7,281,036 B1 * | 10/2007 | Lu et al. .................... | 709/220 |
| 7,411,916 B2 * | 8/2008 | Sakov et al. .............. | 370/252 |
| 7,437,145 B2 * | 10/2008 | Hamada .................... | 455/410 |
| 7,844,814 B2 * | 11/2010 | Baum ........................ | 713/153 |
| 2004/0047349 A1 * | 3/2004 | Fujita et al. ............... | 370/389 |
| 2007/0127461 A1 * | 6/2007 | Yamada et al. ........... | 370/389 |
| 2009/0199291 A1 * | 8/2009 | Hayasaka et al. ......... | 726/14 |
| 2010/0217847 A1 * | 8/2010 | Cook et al. ................ | 709/222 |

* cited by examiner

*Primary Examiner* — Chi Pham
*Assistant Examiner* — Robert Lopata
(74) *Attorney, Agent, or Firm* — Jetter & Associates, P.A.

(57) ABSTRACT

A method for detecting a proxy Address Resolution Protocol (ARP) agent in a network including at least a first machine with an IP address in a range of a first subnet, and at least one embedded controller with an IP address in a range of a second subnet. A router is also provided, wherein the second subnet is not contactable through the router provided its proxy ARP is disabled. The first machine and second machine each have static routes for inter-subnet communications. A test IP address is identified by the first machine. A test Media Access Control (MAC) address corresponding to the test IP address is then obtained. The test MAC address is compared to a range of MAC addresses for the embedded controller. An alarm is generated at the first machine if the test MAC address is outside the range of MAC addresses that can prompt actions to remove the proxy ARP condition.

16 Claims, 2 Drawing Sheets

METHOD 100

METHOD FOR DETECTING A PROXY ARP AGENT IN SECURE NETWORKS HAVING EMBEDDED CONTROLLERS

FIELD

Disclosed embodiments relate to methods for detecting the presence of proxy Address Resolution Protocol (ARP) agents in secure networks having embedded controllers.

BACKGROUND

Routers are often configured to have a capability commonly referred to as proxy ARP. Proxy ARP responds to machines in one subnet that are trying to resolve addresses that are outside of the range of addresses in its own subnet (e.g., a host within another subnet). The router will provide the IP address/Media Access Control (MAC) address association for the router interface address as a response to such requests. As known in computer networking, a MAC address is a unique identifier assigned to most network adapters or network interface cards (NICs) by the manufacturer for identification, and used in the MAC protocol sub-layer. Proxy ARP can help a machine on a subnet reach a machine on a remote subnet without the need to reconfigure routing or provide a default gateway in the network.

Certain plants (e.g., petrochemical plants) include embedded process controllers that utilize secure networks to avoid the embedded process controllers from being manipulated by unauthorized individuals. In such arrangements, the router's proxy ARP is disabled and the embedded processor (s) utilize a separate IP address range, or subnet, that is not in the main plant subnet, and is not contactable through the plant's bridge or router. Static routes are added to embedded controllers and one or more machines in the main plant subnet (e.g., a server) to enable the machines in one subnet to know how to reach machines in the other subnet.

SUMMARY

The Inventor has recognized that proxy ARP can have detrimental effects on the network for secure network arrangements for systems such as petrochemical plants that include embedded process controllers that are in a subnet separate from the subnet used by other machines in the network. The network comprises at least a first machine with an IP address in the range of a first subnet, and a separate second subnet (i.e., having an address range outside an address range for the first subnet) having at least one embedded controller with an IP address in the range of the second subnet. The network router is configured and is intended to have its proxy ARP disabled. Without its proxy ARP disabled, the second subnet is not contactable through the router. Static routes are provided to the first machine and the embedded controller to enable communications between the first and second subnet.

In this secure network arrangement, the Inventor has recognized the following scenario which can result in a loss of communication and/or a loss of view. Although proxy ARP is a condition that is known to be avoided in secure network arrangements, and proxy ARP is disabled on the router upon installation (e.g., by the network technician), the router may inadvertently become enabled for proxy ARP. For example, proxy ARP may become enabled on a startup (e.g., after plant maintenance) when the router configuration is new or when someone has reconfigured the router and unknowingly re-enables proxy ARP. It is also possible that the configuration to remove the proxy ARP has been done, but not saved, and when the router reboots the proxy ARP condition returns.

Broadcast domains in networks disclosed herein include both the first and second subnet. A first machine, such as a server for example, sends an ARP broadcast periodically. Since the ARP request is a broadcast, all machines in the network's broadcast domain see the request. The router receives the request and recognizes that the IP address in the request is outside of the address range covered by its IP address and subnet mask. If the router is currently configured to respond with a proxy ARP, it replies with its own MAC address for the IP address in the request. The embedded controller has an IP address within the range of a second subnet that also receives the broadcast and replies to the broadcast with its MAC address. There is a chance that either the router or embedded controller's MAC address will be loaded into the ARP cache accessible by the first machine.

If the router's response is the one that gets accepted by the first machine, the ARP cache accessible at the first machine will have the embedded controller's IP address paired with the MAC address of the router, so that when the next transmission from the first machine (e.g., server) to the embedded controller occurs, the MAC address used will be that of the router. The network will deliver this packet from first machine (e.g., server) to the router which will attempt to forward it. Since the router does not know where the second subnet for the embedded controller is, the router will send the packet to its gateway of last resort and it will be dropped. While this condition is in effect, the embedded controller will not be able to communicate with the first machine (e.g., server) and a loss of view or control will occur. Similarly, if the embedded controller is the broadcasting machine, a loss of view or control will occur when the embedded controller has access to stored first machine address information having the MAC address of the router instead the MAC address of the first machine.

Embodiments of the invention provide methods for detecting the presence of proxy ARP, which allow corrective action to be taken (e.g., reconfiguring the router to remove the proxy ARP condition). The secure network generally comprises at least a first machine on a first subnet with an IP address in the first subnet range, and at least one embedded controller with an IP address in the second subnet range, and generally a plurality of embedded controllers addressed within the respective second subnet. With its proxy ARP disabled, the second subnet is not contactable through the router. The first machine and embedded controller each are provided static routes for inter-subnet communications. A test IP address is identified by the first machine. A test MAC address associated with the test IP address is obtained. The test MAC address is compared to a range of MAC addresses for the embedded controller. An alarm at the first machine is generated if the test MAC address is outside the range of MAC addresses as this is evidence of the response from a proxy ARP agent. The alarm may prompt the operator to notify the network service department to immediately reconfigure the router to remove the proxy ARP condition.

DETAILED DESCRIPTION

Figure 1:
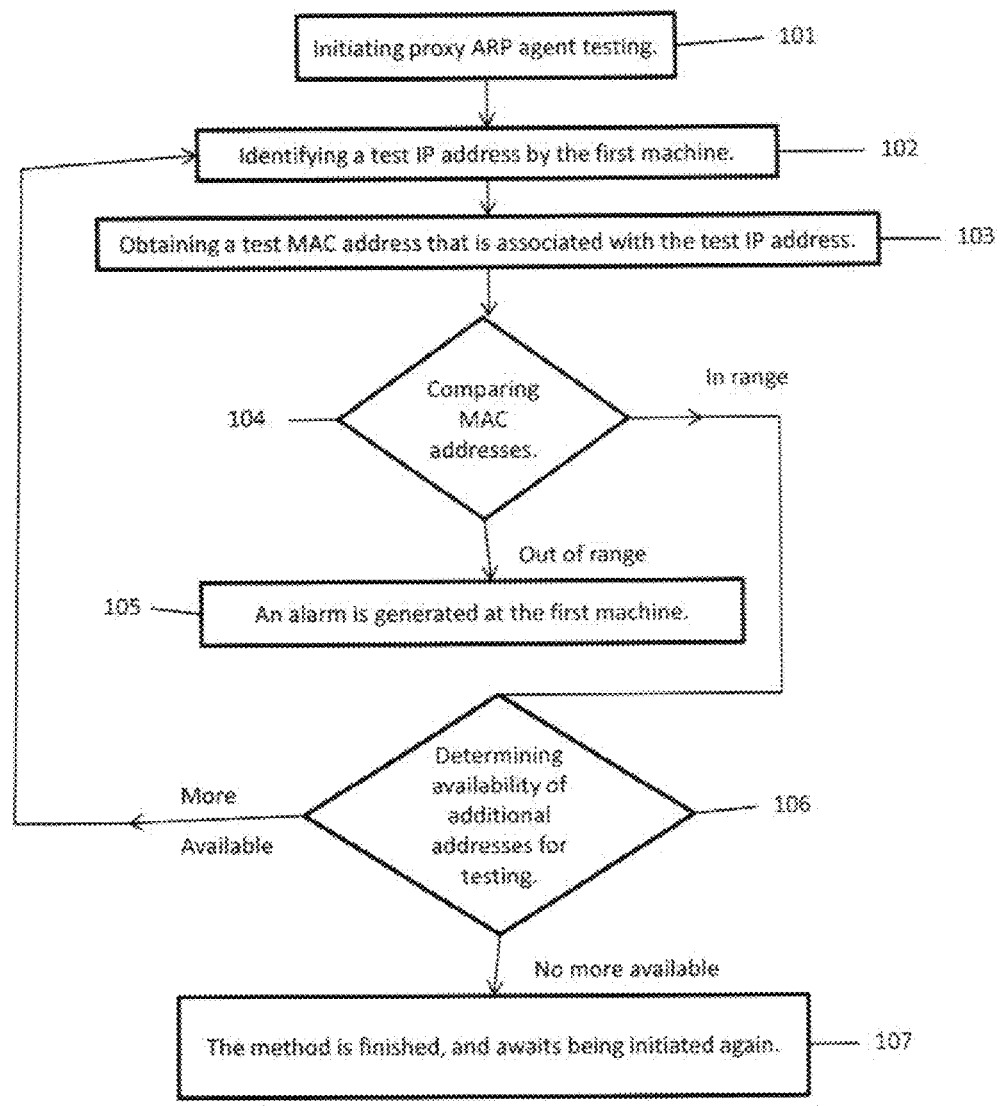
FIG. 1 is a flow chart showing steps in an exemplary method for detecting a presence of a proxy ARP agent in a network, according to a disclosed embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Certain secure network arrangements, such as for the EXPERION control system provided by HONEYWELL INTERNATIONAL, has the ability to reuse IP addresses that are employed by embedded controllers by using a separate address range (e.g., second subnet), that is not in the main (e.g., first) subnet address range, and is not contactable through a bridge or router since proxy ARP at the bridge or router is disabled when the network is configured. The servers and consoles, etc. in the first subnet are given IP addresses and subnet masks. The range of other addresses in the subnet that can be reached are defined by these two values. Addresses that are outside of this range (i.e., in other subnets) in conventional networks are reached by using a default gateway.

The IP address of this default gateway is that address assigned to the router interface which will in conventional networks will route the traffic from the above mentioned subnet to other subnets. However, in systems such as the EXPERION control system, for example, a separate address range, one that is not reachable using the router since the router is proxy ARP disabled, is configured in the embedded controllers. Static routes at both the first machine (e.g., server PC) in the first subnet and the embedded controller (s) in the second subnet enable inter-subnet communications.

FIG. 1 is a flow chart showing steps in an exemplary method 100 for detecting a presence of a proxy ARP agent in a network, according to a disclosed embodiment. The network comprises at least a first machine on a first subnet with an IP address in the first subnet, and a second subnet having an address range outside an address range of the first subnet having at least one embedded controller with the IP address in the second subnet. The first machine can be any machine compatible with TCP/IP, such as, for example, a server PC. With its proxy ARP disabled, the second subnet is not contactable through the router. As known in the art, an embedded controller is a device that performs embedded control. The main differentiating feature of an embedded controller is that all system operation is not controlled by external PC.

Static routes are provided for one or more machines in the first subnet and for one or more machines in the second subnet for enabling inter-subnet communications. A static route as defined herein is a configured range of addresses set in an individual machine to tell the IP stack to send the packet out a specific interface if the destination IP address of the packet is in the configured IP address range. The static route enabled machine is able to send an ARP for machines in this address range rather than using the MAC address of the default gateway.

Step 101 comprises initiating proxy ARP agent testing. The method can be initiated ("waken up") by a timer to run automatically for periodic proxy ARP agent testing, such as every x minutes (e.g., every 5, 7.5 or 10 minutes). However, the method can be run aperiodically, such as being triggered by certain events (startup after a power failure or system shutdown), or run manually.

Step 102 comprises identifying a test IP address by the first machine. In a first embodiment, a database is queried that contains a range of IP address for the embedded controllers. In a second embodiment the contents of an ARP cache accessible by the first machine that reflects responses received responsive to ARP requests from the first machine is used to identify the test IP address.

Step 103 comprises obtaining a test MAC address associated with the test IP address. In the first embodiments this involves sending an ARP request using the test IP address, and if a response is received, using the MAC address in the response as the test MAC address. In the second embodiment, the look up from the ARP cache in step 102 provides the test MAC address corresponding to the test IP address.

Step 104 comprises comparing the test MAC address to a range of MAC addresses for the embedded controller. In one embodiment, this MAC address range is stored in the registry of the first machine (e.g., when the first machine is a WINDOWS PC). In another embodiment the MAC address range is provided by a fixed configuration that is compiled into the test application code. If the test MAC address is outside the range of MAC addresses, the method reaches step 105 where an alarm is generated at the first machine.

The alarm, which may be audible or non-audible (e.g. a blinking light) may prompt the operator to notify the network service department to immediately configure the router to remove the proxy ARP condition which as described above may result in a loss of view or control. If the first machine is a WINDOWS PC, a WINDOWS event can also be created.

If the test MAC address is within the range of MAC addresses, the method reaches step 106 where it is determined whether there are one or more available additional addresses for testing in the ARP cache accessible by the first machine. If there are one or more available additional IP addresses for testing, the method returns to step 102 where the available additional IP address is used as the new test IP address. If there are no more available additional IP addresses for testing, the method can advance to step 107 where the method is finished, and can then await being initiated again.

In contrast to disclosed embodiments which use the action of the proxy ARP agent's response to externally generated ARP requests to detect unwanted proxy ARP activity, known methods for detecting proxy ARP obtain the running configuration from the router and check for the existence of the proxy ARP agent. This requires the first machine (e.g. server PC) to have access to the router management IP address and to the access parameters (username password or credentials for SSH) which may not be accessible due to the security policy in place.

Figure 2:
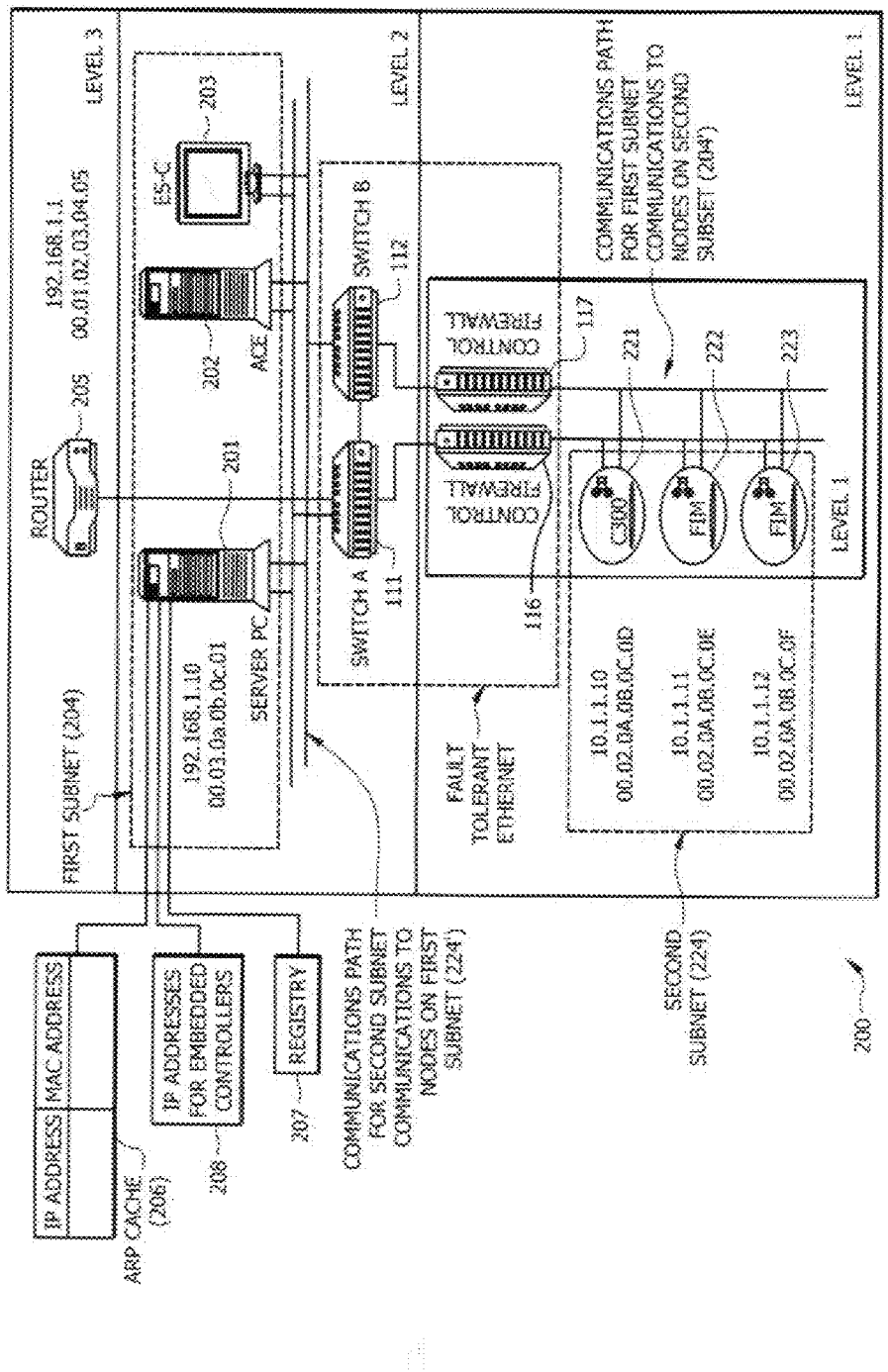
FIG. 2 is a network diagram for a network for a simplified secure control system comprising a plurality of different network levels, where a plurality of embedded controllers are at the first network level, that is used to explain operation of a method for detecting a proxy ARP agent according to a disclosed embodiment.

FIG. 2 is a network diagram for a secure network 200 for a simplified secure control system comprising a plurality of different network levels, where a plurality of embedded controllers are at the first network level, that is used to explain operation of a method for detecting a proxy ARP agent according to a disclosed embodiment. The terms Level 1, Level 2 and Level 3 refer to network levels described by the Purdue plant model and in the ISA99 specification. It is noted that although the communications paths are shown in FIG. 2 as a bus structure for simplification, communications in network 200 are generally via a switched network.

Network 200 includes embedded controller 221, and other embedded controllers shown as FOUNDATION FIELDBUS interface modules (FIMs) 222 and 223 that are shown in Level 1 that have IP addresses within the range of a second subnet 224. In level 2, a first machine shown as a server PC 201 along with an application machine (ACE) 202 and a console station (ES-C) 203 are shown that have addresses within the IP address range for the first subnet 204. A router 205 is shown in Level 3. The server PC 201 is shown having access to an ARP cache 206, a registry 207 that stores a range of MAC addresses for the embedded controllers, and an IP address range database 208 having an IP address range for the embedded controllers in the network 200. In its intended configuration, router 205 has its proxy ARP capability disabled. With its proxy ARP disabled, the second subnet is not contactable through the router.

The machines in Level 2 have an IP address in the same subnet as the router 205 (192.168.1) with the router 205 providing the default gateway. The router 205 connects to the respective subnets using one of the redundant switches 211 and 212 of the Fault Tolerant Ethernet (FTE) community shown that also includes control firewalls 216 and 217. A communications path 204' is shown for communications from first subnet machines (e.g. server PC 201) following transmission by switch 111 and control firewall 116 to machines on the second subnet 224. A communications path 224' is also shown for communications from machines on the second subnet 224 following transmission by control firewall 117 and switch 112 and to machines on the first subnet 204.

In network 200, the same broadcast domain includes the embedded controllers 221, 222 and 223 on Level 2, the machines on Level 1, as well as the router default gateway. The Level 1 machines comprising embedded controller 221 and FIMs 222 and 223 are configured with an IP address in a different subnet (subnet 2) from the first subnet that includes the router 205 (Level 3) and Level 2 machines. Exemplary IP addresses and MAC addresses are shown in FIG. 2 for discussion only. For purposes of this example the subnet mask for all machines in the network is 255.255.255.0.

A proxy ARP related failure scenario that is avoided by disclosed embodiments for secure network arrangements having two or more subnets that are intended to not be connectable through the router by having its proxy ARP disabled, such as shown in FIG. 2, is described below. Assume the proxy ARP for the router 205 is enabled for some reason, such as becoming inadvertently enabled upon reboot. At a Level 2 machine, such as the server PC 201 for example, an ARP broadcast is sent periodically.

For example, a typical ARP broadcast message might be a "who has IP address 10.1.1.10" request. Since the ARP request is a broadcast message, for networks for disclose embodiments all machines in its broadcast domain see this request. The router 205 receives the request and recognizes that it is outside of the address range covered by its IP address and subnet mask. Since the router 205 is now configured to respond with a proxy ARP, it replies with its own MAC address 00.01.02.03.04.05 for the IP address of 10.1.1.10. The embedded controller 221 also responds to the broadcast message with its MAC address, but there is a chance that the MAC address of the router 205 and there is also a chance that the MAC of the embedded controller 221 will be used by the requesting machine 201. If the response from the router 205 is the one that gets accepted by the requesting machine 201, the ARP cache accessible by the server 201 will have the following association, IP address MAC address
10.1.1.10 00.01.02.03.04.05

Thus, when the next transmission from the server PC 201 to embedded controller 221 occurs, the MAC used in this communication will be 00.01.02.03.04.05 (i.e., the MAC address of the router 205). The network 200 will deliver this packet to the router 205 which will attempt to forward it. Since the router 205 does not know where the second subnet is, it will send it to its gateway of last resort and it will be dropped. While this condition is in effect, the embedded controller 221 will not be able to communicate with the server PC 201 and a loss of view and/or loss of control will generally occur.

As disclosed herein, in a first embodiment, an automatic service that can be time triggered is added to the first subnet machines that have communications with at least one of the embedded controllers, such as embedded controller 221. The first machine can query the IP address range database 208 that contains the IP address range of the embedded controllers to obtain this range. Alternatively, a fixed configuration can be used that defines the IP address range. The service can start at the beginning of the range, and can generate an ARP request for the first unused IP address in the range. If the server PC 201 in the first subnet receives a response, it examines the MAC address in the response and compares it with the configured ranges of the controller MAC address stored in registry 207. If the MAC address obtained is in the configured range then the server PC 201 can conclude a controller responded to its ARP request and that is a legal response. The service can sleep until the next trigger to initiate, typically a periodic trigger.

However, if the MAC address in the response received is determined to not be in the configured range, then it is determined to be a proxy ARP response. The service can then cause an alarm to be generated. For embodiments the first machine is a WINDOWS PC, the method can put an event in the WINDOWS event log where it can be picked up by an alarm and event system loaded to server PC 201. If there is a timeout, then there is no proxy ARP agent in the subnet and the service can sleep until the next trigger to initiate, typically a periodic trigger.

In a second embodiment, the automatic service for detecting proxy ARP involves IP address chosen for proxy ARP testing being looked up in the first machines ARP cache 206. If there is an entry in ARP cache 206, the MAC address of the entry can be compared with the controller MAC address ranges in registry 207, and if the MAC address is in this range, then the ARP request is not needed for this address and the service can go on to test another address in ARP cache 206. If the MAC address of the entry in the first machine's ARP cache 206 is not in the controller MAC address ranges in registry 207, it is determined to be due to a proxy ARP response and an alarm can be issued. This alternate embodiment can save time waiting for ARP request answers for addresses known to have responded and as a result will more quickly detect an already existing proxy ARP response from server 205.

The first and second embodiments can be performed in any address order or interleaved (i.e., run concurrently) to minimize the amount of time to find the existence of a proxy ARP agent.

Although disclosed embodiments have been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In light of the forgoing description, it should be recognized that the subject matter in this Disclosure can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

Disclosed embodiments can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit this Disclosure in any way, except as set forth in the following claims.

I claim:

1. A method for detecting a proxy Address Resolution Protocol (ARP) agent in a network comprising at least a first machine with an IP address in a range of a first subnet, and at least one embedded controller with an IP address in a range of a second subnet, a router, wherein said second subnet is not contactable through said router provided its proxy ARP is disabled, said first machine and said embedded controller each having static routes for inter-subnet communications, comprising:
   identifying a test IP address by said first machine;
   obtaining a test Media Access Control (MAC) address corresponding to said test IP address;
   comparing said test MAC address to a range of MAC addresses for said embedded controller, and
   generating an alarm at said first machine if said test MAC address is outside said range of MAC addresses.

2. The method of claim 1, wherein said identifying comprises querying a database that contains a range of IP address for the embedded controller.

3. The method of claim 2, wherein said range of IP addresses for said embedded controller is stored in a database accessible by said first machine.

4. The method of claim 2, wherein said obtaining comprises sending an ARP request using said test IP address, and if a response is received, using said MAC address received in said response as said test MAC address.

5. The method of claim 1, wherein a look up of content of an ARP cache accessible to said first machine provides said identifying of said test IP address and said obtaining said test MAC address.

6. The method of claim 1, wherein if said comparing determines that said test MAC address is within said range of MAC addresses, determining whether there is at least one available additional address for testing, and if there is said available additional address for testing, repeating said obtaining and said comparing using said available additional IP address.

7. The method of claim 1, wherein if said comparing determines that said test MAC address is within said range of MAC addresses, and if there are no more available additional IP addresses for testing, finishing said method.

8. The method of claim 1, further comprising the step of automatically initiating said method at a predetermined time interval using a timer.

9. The method of claim 1, wherein said range of MAC addresses for said embedded controller is provided by a fixed configuration.

10. The method of claim 1, wherein said first machine comprises a server for said network.

11. The method of claim 10, wherein said range of MAC addresses for said embedded controller is stored in a registry of said server.

12. A computer program product for detecting a presence of a proxy Address Resolution Protocol (ARP) agent in a network comprising at least a first machine on a first subnet with an IP address in a first subnet range, and at least one embedded controller with an IP address in a second subnet range, a router, wherein said second subnet is not contactable through said router provided its proxy ARP is disabled, said first machine and embedded controller each having static routes for inter-subnet communications, said computer program product comprising:
   non-transitory machine readable storage having code stored therein for implementation by a processor, said code comprising:
      code for identifying a test IP address by said first machine;
      code for obtaining a test Media Access Control (MAC) address corresponding to said test IP address;
      code for comparing said test MAC address to a range of MAC addresses for said embedded controller, and
      code for generating an alarm at said first machine if said test MAC address is outside said range of MAC addresses.

13. The computer program product claim 12, wherein said identifying comprises querying a database accessible by said first machine that contains a range of IP address for said embedded controller, wherein said range of IP addresses for said embedded controller is stored in said database.

14. The computer program product claim 12, wherein said obtaining comprises sending an ARP request using said test IP address, and if a response is received, using said MAC address received in said response as said test MAC address.

15. The computer program product claim 12, wherein a look up of content of an ARP cache accessible by said first machine provides said identifying of said test IP address and said obtaining said test MAC address.

16. A method for detecting a proxy Address Resolution Protocol (ARP) agent, comprising:

utilizing a network comprising at least a first machine with an IP address in a range of a first subnet, and at least one embedded controller with an IP address in a range of a second subnet, a router, wherein said second subnet is not contactable through said router provided its proxy ARP is disabled, said first machine and said embedded controller each having static routes for inter-subnet communications;

identifying a test IP address by said first machine;

obtaining a test Media Access Control (MAC) address corresponding to said test IP address;

comparing said test MAC address to a range of MAC addresses for said embedded controller, and generating an alarm at said first machine if said test MAC address is outside said range of MAC addresses.

* * * * *